July 16, 1929. G. Y. MARDEN 1,721,228

PLANT OR FRUIT PROTECTING MEANS

Filed Dec. 17, 1926

G. Y. Marden
INVENTOR

By Marden & Clark
Attys.

Patented July 16, 1929.

1,721,228

UNITED STATES PATENT OFFICE.

GRAHAM YOUNG MARDEN, OF MARSTON MAGNA, ENGLAND.

PLANT OR FRUIT PROTECTING MEANS.

Application filed December 17, 1926, Serial No. 155,523, and in Great Britain February 6, 1926.

This invention relates to plant protecting means and has special reference to means adapted to be used in connection with plants such as strawberry plants of the type comprising a flat pad or mat having a central aperture whereby the fruit is held away from the earth during the formation and ripening period and is thus maintained in a clean and wholesome condition.

The invention consists in a plant protecting device comprising a flat mat of substantially rectangular form having a central aperture and composed of straws having their ends folded over, said straws being connected together by rows of stitching passing through such folded over ends and the adjacent portions.

In the accompanying drawings:—

In carrying the invention into effect according to one convenient mode the protecting pad or mat 2 comprises straw or like material which is laid parallel or substantially parallel and fastened together by rows 3 of stitches or in any other suitable manner.

The pad may conveniently be of square, round or rectangular shape and the stitching may be effected on a suitable sewing machine.

A central aperture 4, of any suitable size and preferably circular, is provided and this may be cut after the stitching is effected. A passage 5 may be provided connecting with said central aperture 4. Such passage may be arranged parallel with the strands of straw or at right-angles thereto or at any other suitable angle.

This passage 5 may be provided in the manufacture of the pad or it may be cut just prior to applying the pad to the plant. In the latter case the passage may conveniently be provided at right-angles to the lay of the straw and between the rows of stitches so that unravelling of the stitching would not be caused by the cutting of the passage.

Hemp, string or the like may be used for the stitching or wire may be used for fastening the straw together. When using hemp or the like a tape may be provided on one or both sides of the pad.

The pad may be manufactured by mounting the straws or the like in a gripping frame and then passing the frame through a stitching machine provided with a plurality of devices whereby the desired number of rows of stitches may be applied. In such case the frame may comprise a pair of hinged members and the straws may be folded over by the hinging of the frame. Alternately, the frame may comprise a central member and outer or side hinged members whereby the straws may be folded over from both ends.

Figure 1:
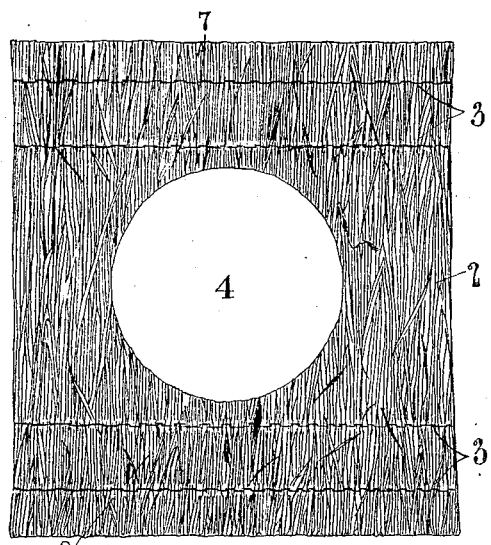
Figure 1 illustrates a protecting pad formed of straw.
Figure 3:
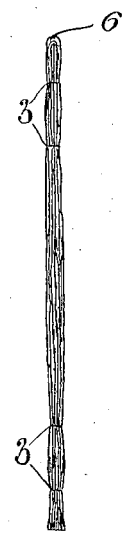
Figure 3 is a cross section of the mat as shown in Figure 1, and indicating the arrangement in which the straws are bent over at one end only.
Figure 2:
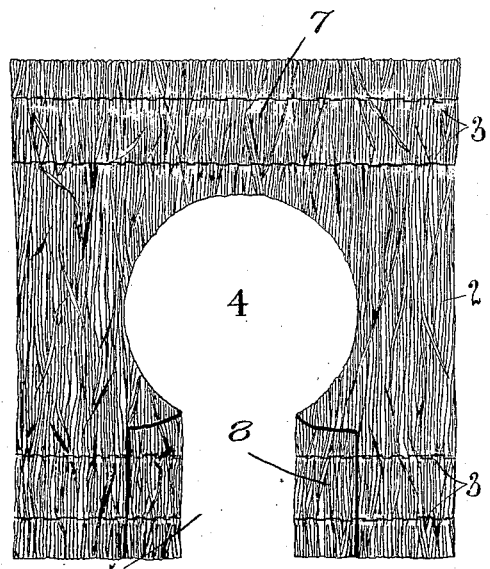
Figure 2 shows a similar pad having a transverse cut with the adjacent parts opened for application to a plant.
Figure 4:
Figure 4 is a cross section of the modification in which the straws are bent over from both ends.

It will be noted in Figure 3 that the straws are folded over at the upper end 6 only, while in Figure 4 the straws are folded from both ends. It is preferred to form the mats according to Figure 4 as it is found that after cutting the central aperture 4 the short straws at 7 and 8 will be held more firmly when folded as in Figure 4.

Means such as sealing wax or black saturating wax, may be applied to the stitching at any suitable point so as to hold the straws more securely to the stitching if desired. For example, the wax may be applied to the stitching and straws adjacent the cut.

According to another method the straws may be fed continuously to a plurality of stitching means whereby a continuous length or band of matting may be formed which may then be cut to the desired lengths. The straws while passing through the stitching zone may be gripped between a pair of continuously travelling bands, the straws being fed into the bands by means such as a spiked roller or band. Cutting devices may be mounted to trim the straws in front of the spiked roller or band.

According to a further method the straws may be woven into a series of warp threads so as to form a continuous length of a plurality of connected mats.

Instead of stitching the straws together they may be fastened by a number of metal strips having clips formed by punched-up tongues.

The pad is applied to the plant by opening the radial cut and placing the pad beneath the plant so that the pad completely surrounds the plant.

In the case of the pad without the radial cut, this may be applied to a plant by folding the mat in half, applying it to the plant while so folded and then unfolding the upper half of the pad while drawing the plant through the aperture.

According to a further arrangement the mat or pad may be of circular shape and formed by winding a rope or strand of material spirally around a former, the various strands being held together by radially arranged rows of stitching or the like.

By the invention a protecting means is provided which may be readily manufactured and easily manipulated to apply it to the plant, elminating the "arranging" of the straw hitherto necessary; and a device is produced the cost of which may be so low that after once using the pad may be destroyed by being burned.

Having now described my invention, what I claim as new and desire to secure by Letters Patent is:—

A plant protecting device comprising a flat mat of substantially rectangular form having a central aperture and composed of straws having their ends folded over, said straws being connected together by rows of stitching passing through such folded over ends and the adjacent portions.

In testimony whereof I have signed my name to this specification.

GRAHAM YOUNG MARDEN.